United States Patent [19]

Chapman et al.

[11] Patent Number: 4,734,349

[45] Date of Patent: Mar. 29, 1988

[54] TONERS AND YELLOW DYE COMPOUNDS USED THEREIN

[75] Inventors: Derek D. Chapman; Julie P. Harmon, both of Rochester, N.Y.

[73] Assignee: Eastman Kodak Company, Rochester, N.Y.

[21] Appl. No.: 910,032

[22] Filed: Sep. 22, 1986

[51] Int. Cl.$^4$ .......................... G03G 9/08; C09B 29/36
[52] U.S. Cl. ...................................... 430/106; 430/109
[58] Field of Search ................................ 430/109, 106

[56] References Cited

U.S. PATENT DOCUMENTS

| | | | |
|---|---|---|---|
| 3,938,992 | 2/1976 | Jadwin et al. | 430/120 |
| 4,139,383 | 2/1979 | Odenwälder et al. | 96/29 D |
| 4,140,684 | 2/1979 | Burkhard et al. | 260/156 |
| 4,201,710 | 5/1980 | Kurtz et al. | 260/156 |
| 4,247,456 | 1/1981 | von Brachel et al. | 260/156 |
| 4,359,418 | 11/1982 | Lienhard et al. | 260/156 |
| 4,368,260 | 1/1983 | Komamura et al. | 430/562 |

Primary Examiner—H. David Welsh
Attorney, Agent, or Firm—Robert A. Gerlach

[57] ABSTRACT

Novel cyano hydroxy pyridone monoazo yellow dye compounds are useful in thermoplastic electrostatographic toners. They absorb at the desired wavelength, are lightfast and have high tinctorial strength. They resist decomposition, sublimation and bleeding upon being thermally fixed to a substrate. For use in color transparencies, these dyes form a transparent toner image.

10 Claims, No Drawings

TONERS AND YELLOW DYE COMPOUNDS USED THEREIN

FIELD OF THE INVENTION

This invention relates to electrostatographic toners and to novel cyano hydroxy pyridone monoazo yellow dye compounds for use in such toners.

BACKGROUND

Electrostatographic toners used, for example, in electrophotographic dry color copying, are in the form of a finely divided, colored, thermoplastic resin powder. To develop an electrostatic charge pattern or latent image on a charged insulating surface, the toner powder is applied to the surface and the charged toner particles are attracted to and develop the latent image. The developed image is then fixed to that surface or transferred to another surface such as a paper sheet where it is fixed, usually by thermal fusion.

Because of the way in which these colored toners are used, the dyes or colorants contained in them require certain properties. They must, of course, absorb at a desired wave length, or, in other words, they must impart the desired color to the toner. Desirably, they should have high tinctorial strength and should be lightfast. For toners that are to be thermally fixed to a substrate, the dyes must resist decomposition and sublimation at the fusing temperature of the toner. They must also be resistant to migration or so-called "bleeding" from the toner resin into the substrate to which the toner is fused. This quality is especially necessary for toners to be used for developing images on both sides of a paper sheet, i.e., in making two-sided copies. Still further, for multi-color development or in developing color transparencies for optical projection on a screen the toner must be transparent. To form such a transparent image the colorant must be soluble in the thermoplastic binder polymer of the toner. In accordance with the present invention toners are provided which contain dyes having this unusual combination of properties. Certain of the dyes also have other valuable characteristics such as that of not forming stable metal complexes. This is important because the paper that is used as the image support may contain metal ions which form stable complexes with certain yellow dyes. Metallization of the dye can shift its hue from yellow to orange. Preferred dyes of the present invention do not form such stable metal complexes.

A large number of cyano hydroxy pyridone monoazo dyes have been disclosed in the prior art, mostly as textile dyes, e.g., U.S. Pat. No. 4,140,684 and U.S. Pat. No. 4,247,456. Some have been suggested for other purposes, for instance, for coloring polymeric films (U.S. Pat. No. 4,359,418), for use in silver halide photographic materials (U.S. Pat. No. 4,368,260 and U.S. Pat. No. 4,139,383), for use in flowable printing inks (U.S. Pat. No. 4,201,710), or for use as sublimable dyes in thermal transfer recording (Japan Kokai No. 60/27,594). The prior art evidently, however, does not suggest the use of such dyes as colorants for thermoplastic toner compositions. Nor does it suggest the novel dyes of the present invention having the unusual combination of properties required for use in thermoplastic toners which are to be fixed to substrates by thermal fusing.

SUMMARY OF THE INVENTION

The yellow dyes of the invention are of the formula:

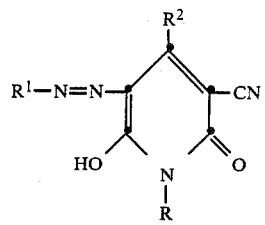

wherein:

R is —HN—$R^3$ or —Alk—$R^4$;

$R^1$ is the radical of a non-ionic diazo component of the benzene or naphthalene series, $R^2$ is alkyl of 1 to 10 carbon atoms, phenyl or lower alkyl-substituted phenyl;

$R^3$ is —$SO_2$—Ar, —$SO_2$—$R^5$ or

$R^4$ is

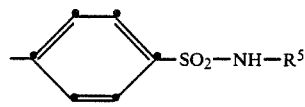

or

—NH—$SO_2$—Ar;

$R^5$ is alkyl of 1 to 12 carbon atoms,

Alk is alkylene of 1 to 4 carbon atoms; and

Ar is phenyl or lower alkyl-substituted phenyl.

The toner composition of the invention is a powdered composition comprising a thermoplastic polymer and a dissolved yellow dye of the above description. In preferred embodiments the polymer is a polyester and the composition also contains a toner charge agent. The dyes are resistant to sublimation, bleeding and thermal decomposition and they dissolve in thermoplastic toner polymers, especially polyesters, to yield toners from which transparent images can be found.

DETAILED DESCRIPTION

The radical R in the compounds of the invention can be an amido or sulfonamido radical of the formula, —HN$R^3$, wherein $R^3$ is —$SO_2$—Ar, —$SO_2R^5$ or

In these radicals Ar can be phenyl or phenyl substituted with one or more lower alkyl groups such as methyl; ethyl or t-butyl and $R^5$ is an alkyl group of 1 to 12 carbon atoms such as methyl, ethyl, n-butyl, t-butyl, n-hexyl, 2-ethylhexyl or 2-ethyldecyl. Preferably $R^5$ is an alkyl group having 3 to 6 carbon atoms. Especially preferred as the radical R are pivalamido and n-butylsulfonamido.

R can also be a radical of the formula —Alk—$R^4$ wherein Alk is an alkylene radical of 1 to 4 carbon atoms including methylene, ethylene and 2-methylpropylene and $R^4$ is as previously stated and specifically illustrated below.

Suitable radicals $R^1$ of the non-ionic benzene or naphthalene series are benzene, diphenyl, naphthalene and anthraquinone radicals, and aromatic heterocyclic radicals, such as thiadiazole, triazole, benztriazole, indole, benztriazole and oxadiazole radicals.

Preferred radicals $R^1$ are benzene or naphthalene radicals which are unsubstituted or substituted with substituents customary in azo dye chemistry. Examples of such substituents include halogen (e.g. chlorine, bromine, fluorine), lower alkyl (e.g. methyl, ethyl), lower alkoxy (e.g. methoxy, ethoxy), phenyl, phenoxy, nitro, cyano, alkylcarbonyl, alkyloxycarbonyl, arylcarbonyl, alkylsulfonyl, arylsulfonyl and the like.

Preferably $R^1$ is a phenyl or naphthalene radical which is unsubstituted or substituted with one or more lower alkyl groups and/or with electron withdrawing groups such as nitro or cyano. Most preferably $R^1$ is a phenyl radical which is substituted with lower alkyl and/or nitro and in the preferred compounds of the invention the alkyl group is methyl. Examples of such preferred radicals are 2-nitro-4-methylphenyl and 2-nitrophenyl.

The radical $R^2$ in the compounds of the invention can be an alkyl group of 1 to 10 carbon atoms, a phenyl group or a phenyl group substituted with one or more lower alkyls. Examples include methyl, ethyl, isobutyl, 2-ethylhexyl and n-decyl, phenyl 4-tolyl, ethylphenyl, and t-butyl-phenyl. Especially preferred are methyl and phenyl.

$R^4$ can also be an alkyl sulfamoylphenyl or sulfonamidophenyl radical of the formula

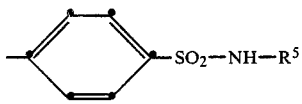

or —NH—$SO_2$—Ar wherein $R^5$ and Ar are as previously defined. Preferred examples of the radical $R^4$ include 4-methylphenylsulfonamido and 2-ethylhexyl-sulfamoylphenyl.

The dyes of the invention can be made by diazotizing an aromatic primary amine of the formula $R^1$—$NH_2$ and coupling the resulting diazonium compound with a hydroxypyridone coupler of the formula:

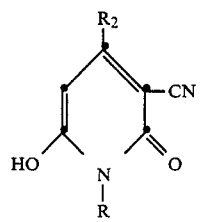

or by reacting a dye of the formula

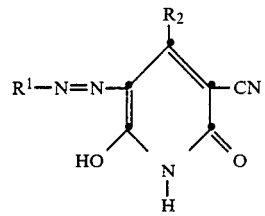

with an alkylating agent of the formula X—R wherein X is halogen.

Preparation of these dyes is illustrated by the examples which follow, starting with the synthesis of intermediates.

EXAMPLE 1

(A) Intermediates Synthesis

1-Amino-3-cyano-6-hydroxy-4-phenylpyridine-2-one

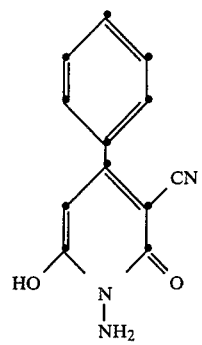

Ethyl benzoylacetate 115.2 g
Cyanoacethydrazide 59.4 g
KOH 33.6 g
Ethanol 1600 mL The KOH was dissolved in the ethanol and the reactants added. The reaction mixture was refluxed with mechanical stirring for 4 hours and then cooled and filtered. The solid was dissolved in hot water acidified to pH3 and filtered. Yield: 84 g. Ref. R. Balicki and P. Nantka-Namirski, Pol. J. Chem. 53, 2225 (1979).

3-Cyano-6-hydroxy-4-phenyl-1-pivalamidopyridin-2-one

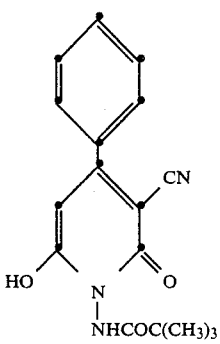

1-Aminopyridone 6.9 g
Pyridine 400 mL
Pivaloyl chloride 49 g

The aminopyridone was dissolved in the pyridine and the pivaloyl chloride added and the mixture stirred at room temperature for 2 hours. The solution was then poured onto ice and HCl and stirred for 2 hours before filtering.

The greenish solid was dissolved in boiling water and allowed to cool. Filtration gave what appeared to be the pyridinium salt of the product but the recovery was rather poor. Saturation of the filtrate with sodium chloride resulted in the precipitation of material which from its nmr spectrum no longer contained any pyridine. Yield: 20 g pyridine salt plus 40 g of sodium salt.

(B) Dye Synthesis

3-Cyano-6-hydroxy-5-(4-methyl-2-nitrophenylazo)-4-phenyl-1-pivalamidopyridin-2-one

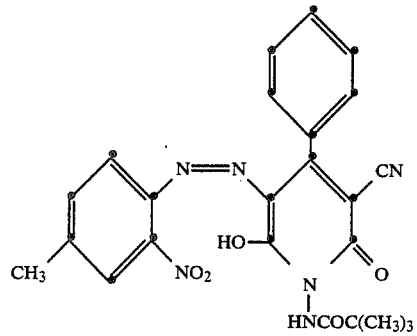

2-Nitro-p-toluidine 25.8 g
250 mL 6N HCl
NaNO$_2$ 12.7 g
1-pivalamidopyridone 58 g (mixture of sodium and pyridine salts)
58 g NaOH 185 g in water 800 mL The toluidine compound was suspended in the HCl, cooled to 0° C. and diazotized by the addition of the NaNO$_2$. Stirring was continued until all the solid was in solution (about 2 hours). Urea was added to decompose any excess nitrous acid. The pyridone compound was dissolved in the NaOH, cooled and the diazo solution added slowly. After 2 hours the mixture was acidified with HCl to pH5 and the dye filtered off and washed with water. Yield: 52 g. Recrystallization from ethanol gave an analytical sample.

EXAMPLE 2

(A) Intermediates Synthesis

1-Butanesulfonamido-3-cyano-6-hydroxy-4-phenylpyridine-2-one

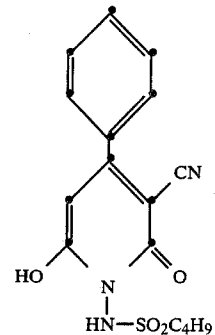

1-Aminopyridone 5 g
Pyridine 80 mL
1-Butanesulfonyl chloride 3.4 g

The aminopyridone was dissolved in the pyridine and the sulfonyl chloride added slowly with stirring. After an hour at room temperature the mixture was poured onto ice and HCl. The product was extracted into methylene chloride and isolated. The product was used for dye formation without purification as the mass spectrum showed only trace impurities.

(B) Dye Synthesis 1-butylsulfonamido-3-cyano-6-hydroxy-5-(4-methyl-2-nitrophenylazo)-4-phenylpyridine-2-one

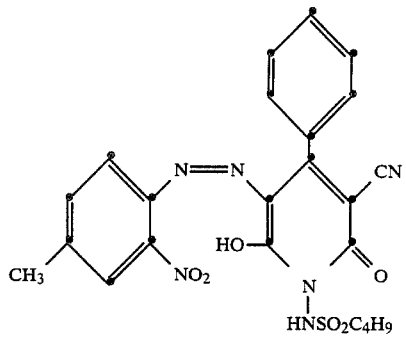

2-Nitro p-toluidine 1.5 g
20 mL 2N HCl
Crude butanesulfonamide 3.5 g
Sodium acetate 15 g in water 100 mL The toluidine was diazotized in the normal way and coupled with the sulfonamide in the sodium acetate solution. After 1 hour the mixture was diluted with water and filtered. The product was recrystallized from ethanol. The nmr spectrum was in accord with the proposed structure. Yield: 2.5 g

EXAMPLE 3

(A) Intermediates Synthesis

4-Bromomethylbenzenesulfonyl chloride

Toluenesulfonyl chloride 62.3 g
Carbon tetrachloride 600 mL
Bromine 16 mL in CCl₄ 150 mL The sulfonyl chloride in the CCl₄ was stirred and treated dropwise with the bromine solution while the flask was being irradiated with a 100 watt lamp. When the bromine color disappeared the mixture was washed with water and the organic layer dried over MgSO₄. Removal of the solvent gave the crude product which was crystallized from hexane. The nmr spectrum showed the presence of about 15% of dibrominated material. The mixture was used without purification to make the sulfonamide.

Mixture of 2-chloro and
2-bromomethyl-N-(2-ethylhexyl)benzenesulfonamide

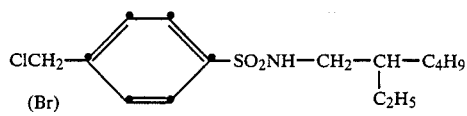

4-Bromomethylbenzenesulfonyl chloride 13.5 g
THF 200 mL
2-ethylhexylamine 6.5 g
N,N-diisopropylethylamine 6.5 g
THF 100 mL The sulfonyl chloride in the THF was cooled in ice and treated dropwise with a mixture of the two amines in THF with stirring. After 4 hours at room temperature part of the THF was removed and the residue poured into water. The product crystallized after being refrigerated overnight and was filtered off. The nmr spectrum showed it to be a mixture containing 60% of the chloro 25% of the bromo and 15% of the dibromo compounds.

(B) Dye Synthesis 3-cyano-6-hydroxy-4-methyl-5-(4-methyl-2-nitrophenylazo)-1-(4-N-(2-ethylhexylsulfamoyl)benzyl)pyridine-2-one

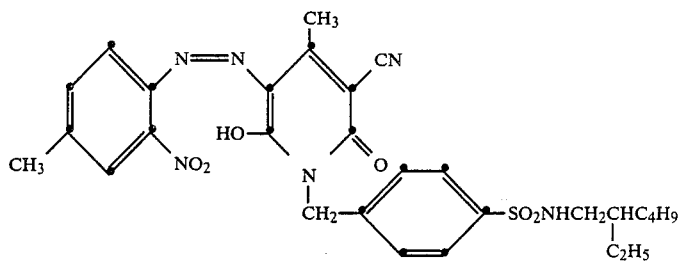

3-cyano-6-hydroxy-4-methyl-5-(4-methyl-2-nitrophenylazo)pyridine-one 17 g
Potassium carbonate 10 g
Mixture of chloro and bromomethylbenzenesulformamides 25 g
Acetone 500 mL This reaction mixture was refluxed for 18 hours, cooled and filtered. The filtrate was evaporated and treated with dilute HCl. The liquid was decanted from the resultant gum and the gum was stirred with methanol. Filtration gave 15 g of essentially pure material. An analytical sample was prepared by recrystallization from ethanol.

Additional dyes prepared by procedures similar to those of the examples above are as follows, the symbols R, R¹ and R² having reference to the molecular structure of formula I above:

TABLE 1

| Example | R | R¹ | R² |
|---|---|---|---|
| 4 | | | |
| 5 | | | |

TABLE 1-continued

| Example | R | R¹ | R² |
|---|---|---|---|
| 6 | CH₂CH₂NHSO₂—⟨C₆H₄⟩— | —CH₃   CH₃— | ⟨C₆H₃(NO₂)⟩—CH₃ |

The toners of the invention are prepared by blending a selected thermoplastic polymer with a yellow dye compound of the invention, the blending being done, for example, by mixing the polymer in granular or pelleted form with the dye and other toner components in suitable proportions and then blending the mixture on heated compounding rolls in known manner. After blending, the toner composition is coarsely ground in a mechanical mill and then is ground to a fine powder in a fluid energy mill.

In the toner compositions of the invention a wide range of thermoplastic binder resins can be employed including, in particular, various polyester and styrene-acrylic copolymer binder resins. Examples of useful polyesters, in addition to those already mentioned include the amorphous polyesters described in the patent to Sandhu et al, U.S. Pat. No. 4,140,644, especially the polyesters of 2,2-dimethyl-1,3-propanediol and 2,2'-oxydiethyanol with terephthalic acid having an inherent viscosity of at least 0.30. Also useful are branched amorphous polyesters prepared from diols, dicarboxylic acids and polyfunctional modifiers such as glycerol, pentaerithritol and polycarboxylic acids as disclosed in the patent to Barkey, U.S. Pat. No. 4,217,440. Others include amorphous polyesters having p-hydroxybenzoic acid recurring units as disclosed in the patents to Sandhu et al, U.S. Pat. Nos. 4,446,302 and 4,416,965 and amorphous carbonate polymers having as recurring units an alkylidenediarylene group, a sulfonyl diarylene group or an oxydiarylene group and a second recurring unit containing an alkylene group, as disclosed in the patent to Merrill et al, U.S. Pat. No. 3,694,359.

Other useful thermoplastic binder resins are various acrylic ester resins including copolymers of styrene with acrylic esters such as methyl methacrylate and t-butyl methacrylate. Examples of such polymers and other useful thermoplastic toner polymers are disclosed in the patents to Sitarmiah, U.S. Pat. No. 4,430,408; Trachtenberg et al., U.S. Pat. No. 3,838,054; and Miskinis et al., U.S. Pat. No. 4,546,060.

Also useful are lightly crosslinked thermoplastic polymers including vinyl polymers, acrylics and polyesters as disclosed in Jadwin et al. U.S. Pat. No. Re. 31,072. Polymers that are normally useful as thermoplastic binders for toners have glass transition in the range from about 40° to 90° C. The blending of the polymer and dye occurs above such temperatures as does the thermal fusion of the toner during image fixing. For instance blending and fixing normally are done in the range from about 110° C. to 170° C. The dyes of the present invention do not decompose and do not sublime substantially at such temperatures.

The concentration of dye in the toner composition can range from about 0.5 to 10 weight percent or higher, concentrations from about 1 to 4 weight percent being preferred.

Additional components of the toner can include a charge control agent to aid in maintaining a stable charge on the toner during the development process. A wide choice of these components is available, including phosphonium and ammonium compounds such as the phosphonium charge agents of U.S. Pat. No. 4,496,643 and the ammonium charge agents of U.S. Pat. No. 4,394,430; U.S. Pat. No. 4,323,634 and U.S. Pat. No. 3,893,935. The charge agent is used in a concentration from about 0.1 to 5 weight percent of the toner composition.

The preparation of specific toners of the invention is illustrated by the following examples:

TONER PREPARATION EXAMPLE

Toners were prepared by compounding dyes of the above examples with a thermoplastic polyester binder resin and an ionic charge control agent. The composition consisting of the particular dye, (0.8 g in Example 3), 0.4 g in the other examples) plus 0.2 g of methyltriphenyl phosphonium tosylate charge control agent and 20 g of the polyester, the latter being a polymeric condensation product of terephthalic acid, glutaric acid, polyethyleneglycol and glycerol, was compounded on a heated two-roll mill at 150° C. for 20 minutes. The compounded material was solidified by cooling, coarsely ground in a mechanical mill and then ground to a fine powder in a fluid energy mill operating at 0.48 MPa (70 psi) air pressure and a feed rate of 1 g per minute.

Each toner sample was subjected to tests, including solubility in the toner resin, light stability, resistance to bleeding and sublimation. The tests were conducted as follows:

Solubility:

After compounding and before grinding, a small amount of the composition (less than 1 g) was softened and pressed to a thin layer on a microscope slide at 200° C. Solubility was determined by viewing the slide in transmitted light with an optical microscope at 400X. When no particulate matter was observed the dye was considered to be dissolved.

Light Fading:

A small amount of toner was manually applied to a sheet of uncoated paper, fused at 155° C. and ferrotyped by pressing with a plastic sheet at 155° C. The toned areas had a density of 1.0. Light stability of the dyes in the toned areas was evaluated by measuring red, green and blue density shifts on a densitometer. The samples were measured before and after exposure to 7 days of simulated high intensity daylight (HID) at 50,000 lux.

Bleeding:

Samples prepared in the same manner as for the light fading test were tested for bleeding through the paper at room temperature and at 40° C. The densities of toner dye on the back of the paper were recorded initially and at intervals. Blue absorption was measured with a densitometer.

Sublimation:

Dye sublimation was tested by placing approximately 0.25 g of toner on a microscope slide which was placed at a hot plate at about 150° C. The slide was covered with a funnel, the neck of which was packed with white polyester filter material. The funnel stem was attached to a vacuum line and after 10 minutes the filter packing was observed for yellow color.

The following table lists the results of the tests on the dyes of the Examples.

TABLE 2

| Example | M.P. °C. | Wt. % Dye in Toner | λmax | Change in Blue Density After 7 days HID | Change in Blue Density After 3 weeks 16 K lux | Toner Laydown for initial unit density mg/cm² |
|---|---|---|---|---|---|---|
| 1 | 167 | 2 | 462 | −0.03 | 0.02 | 0.50 |
| 2 | 206 | 2 | 464 | −0.03 | 0.03 | 0.52 |
| 3a | 166 | 4 | 459 | −0.07 | −0.12 | 0.45 |
| 3b | 166 | 2 | 459 | −0.12 | −0.13 | 0.60 |
| 4 | 264 | 2 | 451 | −0.10 | −0.06 | 0.72 |
| 5 | 269 | 2 | 462 | −0.13 | −0.04 | 0.72 |
| 6 | — | 2 | 458 | −0.15 | −0.04 | 0.87 |

All of the dyes of Table 2 passed the solubility tests, the sublimation tests and the bleeding tests. However, some other cyano hydroxy pyridone dyes failed one or more of the tests. For instance, dyes having an alcohol substituent or no substituent on the ring nitrogen of the pyridone nucleus (i.e., R=hydroxyalkyl or hydrogen) were insoluble in the polyester binder resin. A dye in which R=n-butyl and R¹=methylthiophenyl failed both the bleeding test and the sublimation test.

In addition to the tests indicated in Table 2, the dyes of Examples 1 and 2 were tested for metallization which would cause a shift in hue from yellow to orange if the dyes should metallize when in contact with metal ions in a paper sheet.

No metallization was observed in the tests of the dyes of examples 1 and 2. However, a control dye in which R was hydrogen failed the metallization test.

The invention has been described in detail with reference to preferred embodiments, but it will be understood that variations and modifications can be made within the spirit and scope of the invention.

We claim:

1. A powdered toner composition comprising a thermoplastic polymer blended with from about 0.5 to 10 percent by weight of a yellow dye having the formula:

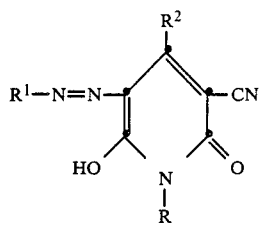

wherein:
R is —HN—R³ or —Alk—R⁴,
R¹ is the radical of a non-ionic diazo component of the benzene or naphthalene series,
R² is alkyl of 1 to 10 carbon atoms, phenyl or lower alkyl-substituted phenyl;
R³ is —SO₂—Ar, —SO₂—R⁵ or

R⁴ is

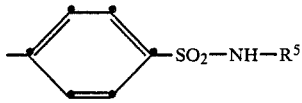

or —NH—SO₂—Ar;
R⁵ is alkyl of 1 to 12 carbon atoms;
Alk is alkylene of 1 to 4 carbon atoms; and
Ar is phenyl or lower alkyl-substituted phenyl.

2. A powdered toner composition according to claim 1 wherein the thermoplastic polymer is a polyester and the dye has the formula:

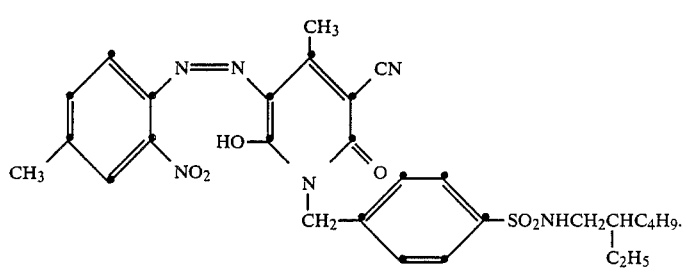

3. A powdered toner composition according to claim 1 wherein the thermoplastic polymer is a polyester and the dye has the formula:

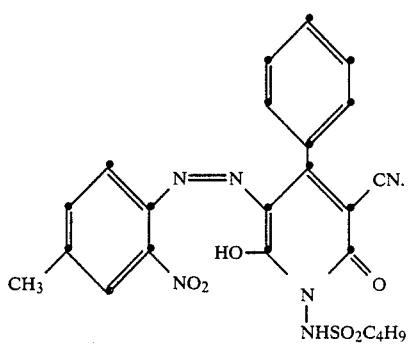

4. A powdered toner composition according to claim 1 wherein the thermoplastic polymer is a polyester and the dye has the formula:

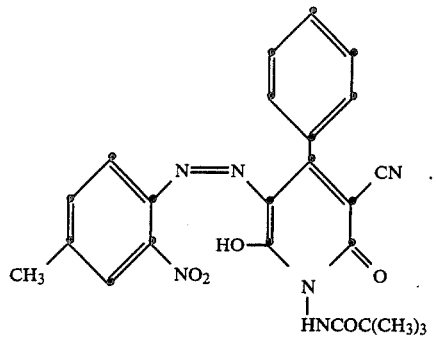

5. A powdered toner composition according to claim 1 wherein the thermoplastic polymer is a polyester and the dye has the formula:

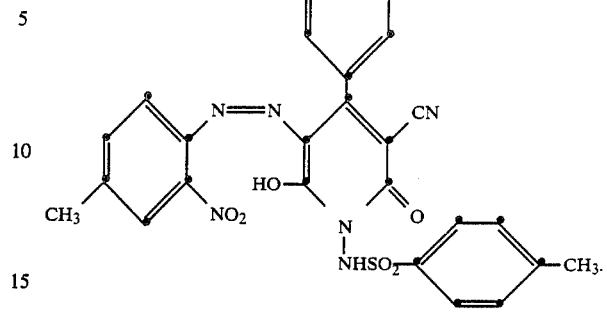

6. A powdered toner composition according to claim 1 wherein the thermoplastic polymer is a polyester and the dye has the formula:

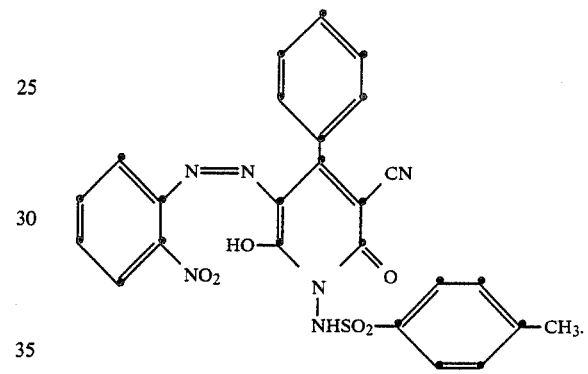

7. A powdered toner composition according to claim 1 wherein the thermoplastic polymer is a polyester and the dye has the formula:

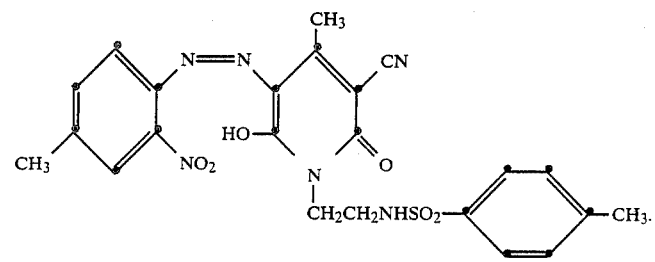

8. A toner composition according to claim 1 wherein the polymer is also blended with a charge control agent.

9. A toner composition according to claim 1 wherein the polymer is a thermoplastic polyester.

10. A toner composition according to claim 1 wherein the polyester is a condensation product of terephthalic acid glutaric acid, propylene glycol and glycerol.

* * * * *